(12) United States Patent
Weeks, Jr. et al.

(10) Patent No.: US 11,342,833 B2
(45) Date of Patent: May 24, 2022

(54) SWITCH FOR A LIGHTING SYSTEM

(71) Applicant: Hubbell Incorporated, Shelton, CT (US)

(72) Inventors: Thomas Warren Weeks, Jr., Simpsonville, SC (US); Douglas Matthew Hamilton, Arlington Heights, IL (US)

(73) Assignee: Hubbell Incorporated, Shelton, CT (US)

( * ) Notice: Subject to any disclaimer, the term of this patent is extended or adjusted under 35 U.S.C. 154(b) by 256 days.

(21) Appl. No.: 16/165,162

(22) Filed: Oct. 19, 2018

(65) Prior Publication Data

US 2019/0124746 A1    Apr. 25, 2019

Related U.S. Application Data

(60) Provisional application No. 62/581,913, filed on Nov. 6, 2017, provisional application No. 62/576,895, filed on Oct. 25, 2017.

(51) Int. Cl.
| | |
|---|---|
| *H02M 1/10* | (2006.01) |
| *H05B 47/10* | (2020.01) |
| *H05B 47/105* | (2020.01) |
| *G08B 17/117* | (2006.01) |
| *G08B 5/38* | (2006.01) |
| *G08B 25/08* | (2006.01) |
| *G08B 5/36* | (2006.01) |

(52) U.S. Cl.
CPC .............. *H02M 1/10* (2013.01); *G08B 5/38* (2013.01); *G08B 17/117* (2013.01); *H05B 47/10* (2020.01); *H05B 47/105* (2020.01); *G08B 5/36* (2013.01); *G08B 25/08* (2013.01)

(58) Field of Classification Search
CPC .... H05B 47/10; H05B 47/105; G08B 17/117; G08B 5/38; G08B 25/08; G08B 5/36; H02M 1/10
See application file for complete search history.

(56) References Cited

U.S. PATENT DOCUMENTS

| | | | | |
|---|---|---|---|---|
| 4,415,964 A | * | 11/1983 | Scharfe, Jr. ............. | H02M 1/10 363/142 |
| 5,521,788 A | * | 5/1996 | Miyazaki ................. | B60L 3/04 361/42 |

(Continued)

FOREIGN PATENT DOCUMENTS

WO    WO2016179655    11/2016

*Primary Examiner* — Renan Luque
(74) *Attorney, Agent, or Firm* — Michael Best & Friedrich LLP (57) ABSTRACT

A switch includes a first terminal, a second terminal, and a third terminal. The switch includes an output node coupled to the second terminal and the third terminal. The switch includes a contactor coupled to the first terminal and movable between at least a first position and a second position. The first terminal is coupled to the second terminal when the contactor is in the first position. The first terminal is coupled to the third terminal when the contactor is in the second position. When the contactor is in the first position, the switch is configured to provide direct current power at the output node. When the contactor is in the second position, the switch is configured to provide alternating current power at the output node.

20 Claims, 9 Drawing Sheets (56) References Cited

U.S. PATENT DOCUMENTS

| | | | | |
|---|---|---|---|---|
| 7,026,768 B1* | 4/2006 | Ruiz | | G08B 7/066 |
| | | | | 315/185 R |
| 9,362,838 B1* | 6/2016 | Balogh | | H02M 7/04 |
| 10,122,252 B2* | 11/2018 | Knoedgen | | H02M 3/33507 |
| 2006/0226795 A1* | 10/2006 | Walter | | H05B 35/00 |
| | | | | 315/312 |
| 2009/0085404 A1* | 4/2009 | Suzuki | | H02J 3/38 |
| | | | | 307/46 |
| 2010/0020527 A1* | 1/2010 | Fiermuga | | F21S 9/022 |
| | | | | 362/20 |
| 2011/0127833 A1* | 6/2011 | Wu | | H02J 9/061 |
| | | | | 307/31 |
| 2011/0309747 A1* | 12/2011 | Michaud | | H05B 47/16 |
| | | | | 315/86 |
| 2012/0001599 A1* | 1/2012 | Tanaka | | H02M 1/10 |
| | | | | 323/205 |
| 2012/0146419 A1* | 6/2012 | Shih | | H02J 9/062 |
| | | | | 307/66 |
| 2012/0188756 A1* | 7/2012 | Kokoski | | F21V 29/763 |
| | | | | 362/217.05 |
| 2012/0326614 A1* | 12/2012 | Tsuji | | H05B 45/10 |
| | | | | 315/200 R |
| 2013/0026835 A1* | 1/2013 | Ghosh | | H02M 1/10 |
| | | | | 307/66 |
| 2013/0147397 A1* | 6/2013 | McBryde | | H05B 45/30 |
| | | | | 315/312 |
| 2013/0234594 A1* | 9/2013 | Huang | | H05B 45/10 |
| | | | | 315/85 |
| 2015/0201474 A1* | 7/2015 | Lee | | H05B 45/37 |
| | | | | 315/191 |
| 2015/0336522 A1* | 11/2015 | Cook | | H02M 7/44 |
| | | | | 307/29 |
| 2016/0118797 A1* | 4/2016 | Balda Belzunegui | | H02M 7/04 |
| | | | | 307/26 |
| 2016/0192455 A1* | 6/2016 | Dubuc | | H05B 33/08 |
| | | | | 315/86 |
| 2017/0303368 A1* | 10/2017 | Brebenel | | H05B 45/37 |
| 2018/0102672 A1* | 4/2018 | Qiu | | H02J 9/065 |
| 2018/0188018 A1* | 7/2018 | Brown | | F21S 9/022 |
| 2018/0233909 A1* | 8/2018 | Reed | | H02J 3/00 |
| 2019/0096614 A1* | 3/2019 | Fehl | | H05B 47/105 |

* cited by examiner

SWITCH FOR A LIGHTING SYSTEM

PRIORITY CLAIM

The present application is based on and claims priority to U.S. Provisional Application No. 62/576,895, titled "Switch for a Lighting System," having a filing date of Oct. 25, 2017, which is incorporated by reference herein. The present application is also based on and claims priority to U.S. Provisional Application No. 62/581,913, titled "Switch for a Lighting System," having a filing date of Nov. 6, 2017, which is incorporated by reference herein.

FIELD

The present disclosure relates generally to lighting systems.

BACKGROUND

A lighting fixture can include a light source that provides illumination for a room or area in which the lighting fixture is mounted. The light source can be selectively coupled to a power source (e.g., mains power supply) via manipulation of a switch (e.g., toggle switch) that is movable between at least a first position and a second position. When the switch is in the first position, the light source can receive electrical power from the power source and can illuminate the room or area. When the switch is in the second position, however, the light source no longer receives electrical power from the power source. In this way, operation of the light source can be controlled via manipulation of the switch.

BRIEF DESCRIPTION

Aspects and advantages of embodiments of the present disclosure will be set forth in part in the following description, or may be learned from the description, or may be learned through practice of the embodiments.

In an example embodiment, a switch can include a first terminal, a second terminal, and a third terminal. The switch includes an output node coupled to the second terminal and the third terminal. The switch includes a contactor coupled to the first terminal and movable between a first position and a second position. The first terminal is coupled to the second terminal when the contactor is in the first position. The first terminal is coupled to the third terminal when the contactor is in the second position. When the contactor is in the first position, the switch is configured to provide direct current power at the output node. When the contactor is in the second position, the switch is configured to provide alternating current power at the output node.

In another example embodiment, a system for controlling operation of a lighting system that includes a light source and an auxiliary load is provided. The system includes a switch couplable to a power source for the lighting system. The switch is movable between at least a first position and a second position. When the switch is in the first position, the switch can be configured to provide direct current power to the auxiliary load. When the switch is in the second position, the switch can be configured to provide alternating current power to both the auxiliary load and the light source.

In yet another example embodiment, a switch includes a first terminal, a second terminal, and a third terminal. The switch includes a first output node and a second output node. The first output node is coupled to the second terminal. The second output is coupled to the third terminal. The switch includes a contactor coupled to the first terminal and movable between at least a first position and a second position. The first terminal is coupled to the second terminal when the contactor is in the first position. The first terminal is coupled to the third terminal when the contactor is in the second position. When the contactor is in the first position, the switch is configured to provide direct current power at the first output node. When the contactor is in the second position, the switch is configured to provide alternating current power at the second output node.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a switch that can be configured to provide an electrical output for powering one or more loads associated with a lighting fixture or other device even when the switch is in a position to disconnect AC electrical power from the lighting fixture or other device. For instance, a lighting fixture can include one or more auxiliary loads, such as a controller, wireless communication device, camera, environmental detection sensor, etc. In some applications, the auxiliary load can receive electrical power from a battery positioned onboard the auxiliary load. However, since the auxiliary load relies on the battery for electrical power, a user must regularly replace the battery to ensure proper operation of the auxiliary load. Replacing the battery can be a rather burdensome task.

According to example embodiments of the present disclosure, electrical power (e.g., DC power) can be provided to a lighting fixture or other device regardless of a position of a switch used to provide AC power to the lighting fixture or other device. In this way, one or more auxiliary loads associated with the lighting fixture can remain powered without requiring a battery or other dedicated power source onboard the lighting fixture.

In some embodiments, a switch can include a first terminal, a second terminal, and a third terminal. The switch can include a first output node and a second output node. The first output node can be coupled to the second terminal. The second output node can be coupled to the third terminal. The switch can include a contactor coupled to the first terminal and movable between a first position and a second position. When the contactor is in the first position, the first terminal can be coupled to the second terminal. When the contactor is in the second position, the first terminal can be coupled to the third terminal. As will be discussed below in more detail, the switch can be configured to output direct current power at the first output node, and alternating current power at the second output node.

In some embodiments, the switch can include a power converter coupled between the first output node and the second terminal. The power converter can be configured to convert alternating current power to direct current power. As such, when the contactor is in the first position, the power converter can receive alternating current power from a power source and can convert the alternating current power to direct current power. In some implementations, the first output node can be coupled to an auxiliary load of the lighting system. As such, when the contactor is in the first position, the switch can deliver DC power to the auxiliary load via the first output node.

When the contactor is in the second position, the switch can provide AC power at the second output node. In some implementations, the switch can be coupled to the light source and auxiliary load of the lighting system via the second output node. In this way, the switch can provide power to both the light source and the auxiliary load when the contactor is in the second position.

The switch according to example embodiments of the present disclosure can provide a number of technical effects and benefits. For instance, when a user toggles the switch to deactivate (e.g., turn off) the light source, the switch can continue to provide electrical power to one or more auxiliary loads via the first output node. In this way, use of energy storage devices (e.g., batteries) to power the auxiliary load can be reduced.

Example aspects of the present disclosure are discussed with reference to a switch used to power a lighting fixture for purposes of illustration and discussion. Those of ordinary skill in the art, using the disclosures provided herein, will understand that switches according to example embodiments of the present disclosure can be used with other loads without deviating from the scope of the present disclosure.

Figure 1:
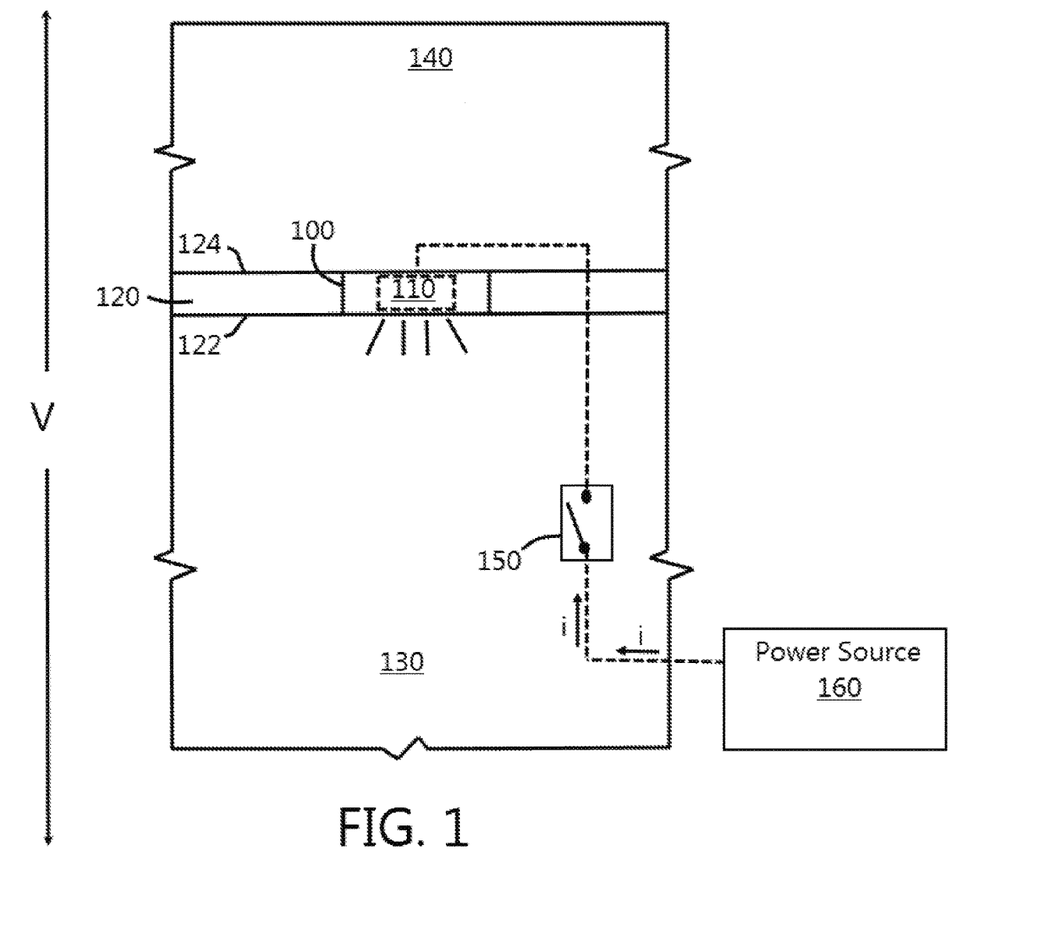
FIG. 1 provides a lighting fixture according to example embodiments of the present disclosure.

Referring now to the FIGS., FIG. 1 depicts a lighting fixture 100 disposed within a ceiling 120 that extends between a first surface 122 and a second surface 124 along a vertical direction V. As shown, the ceiling 120 can separate a first space 130 (e.g., positioned beneath the ceiling 110) from a second space 140 (e.g., positioned above the ceiling 110) along the vertical direction V. In some implementations, the first space 130 can include a room (e.g., kitchen, living room, etc.) of a residential home, and the second space 140 can include an attic positioned above the room.

The lighting fixture 100 can include a light source 110 to provide illumination for the first space 130. As shown, the light source 110 can be disposed within the lighting fixture 100. In some implementations, the light source 110 can include an array of light emitting diodes (LEDs) or any other suitable light source. As discussed below, operation of the light source 110 can be controlled via manipulation of a switch 150, such as a wall switch.

Figure 2:
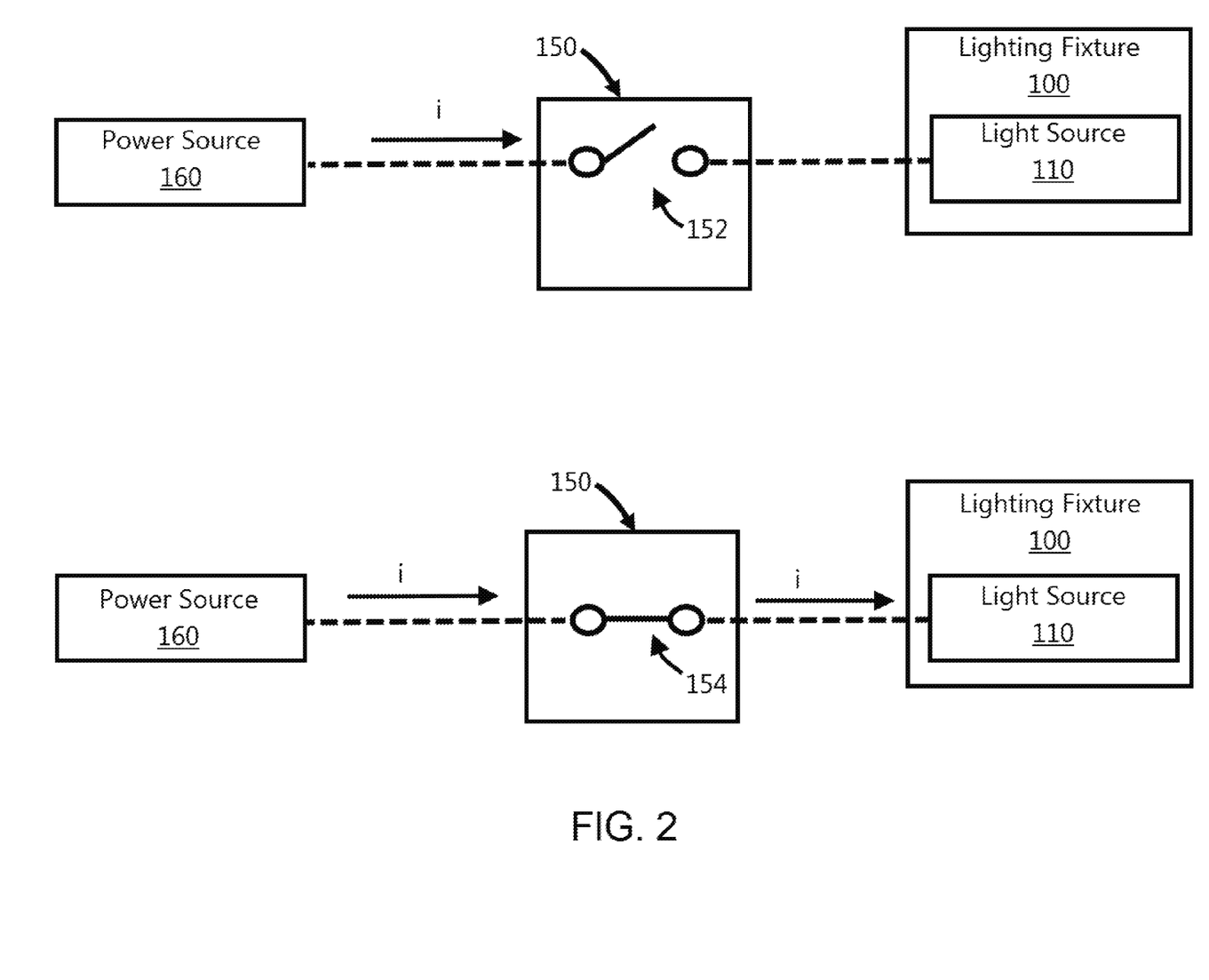
FIG. 2 provide a schematic of a circuit according to example embodiments of the present disclosure.

Referring briefly now to FIG. 2, the lighting fixture 100 can include a power converter 112 configured to receive an input power from a power source 160 (e.g., an AC or DC power source) and convert the input power to an output power suitable for powering the light source 110. In some instances, the light source 110 can include an array of LED light sources, and the power converter 112 can be configured to provide different driving currents to each of the LED light sources. For instance, the power converter 112 can include one or more of a multi-channel driver circuit, a current splitter circuit, one or more current regulators, and/or other devices that can be used to independently provide a driver current to each of the LED light sources.

As mentioned above, the switch 150 can be used to control operation of the light source 110. More specifically, the switch 150 can be used to selectively couple the light source 110 to the power source 160. For instance, the switch 150 can be a single pole single throw (SPST) switch movable between a first position 152 and a second position 154. When the switch 150 is in the first position 152, the light source 110 is not coupled to the power source 160. However, when the switch 150 is in the second position 154, the light source 110 is coupled to the power source 160. In this way, the switch 150 can be used to activate (e.g., turn on) and deactivate (e.g., turn off) the light source 110.

Figure 3:
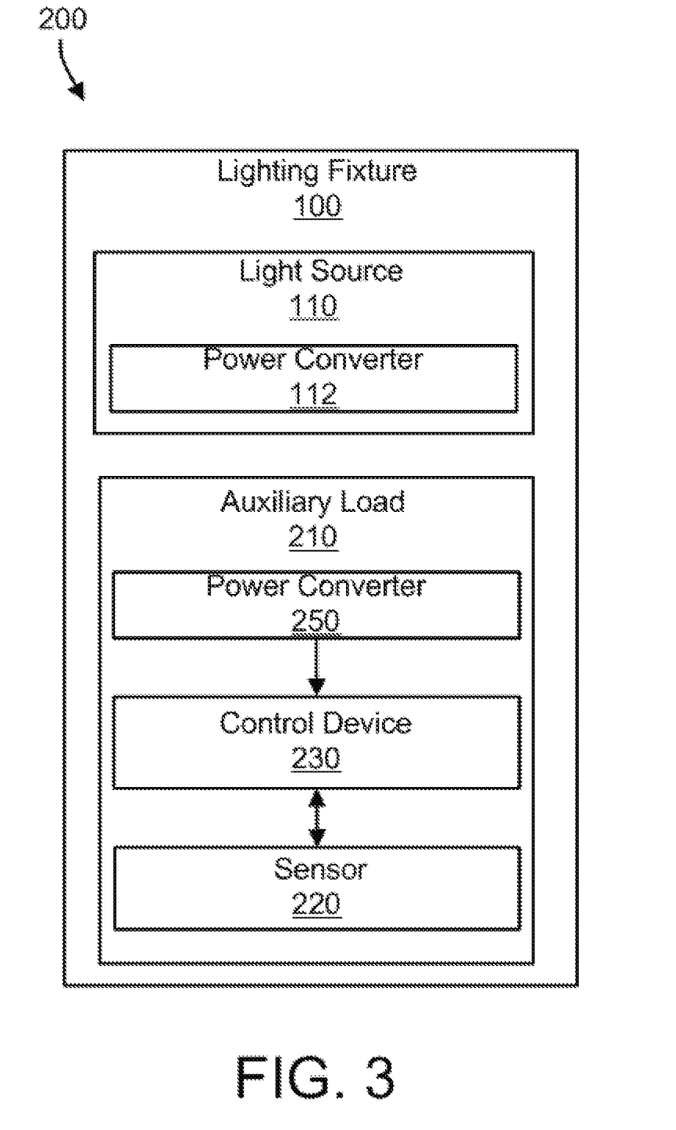
FIG. 3 provides a lighting system according to example embodiments of the present disclosure.

Referring now to FIG. 3, a lighting system 200 according to example embodiments of the present disclosure can include the light source 110 and an auxiliary load 210. In some implementations, the auxiliary load 210 can include one or more sensor(s) 220 operable to sense one or more parameters associated with the first space 130. For instance, the one or more parameters can include an environmental parameter, such as amount of smoke present within the first space 130. In this way, the sensor(s) 220 can collect data that can be used to monitor the first space 130. It should be appreciated, however, that the sensor(s) 220 can be configured to detect any parameter. For example, the sensors(s) 220 can be operable to detect an amount of carbon monoxide (CO) present within the first space 130. In this way, the sensor(s) 220 can collect data that can be used to determine whether there is a CO leak within the first space 130.

Figure 4:
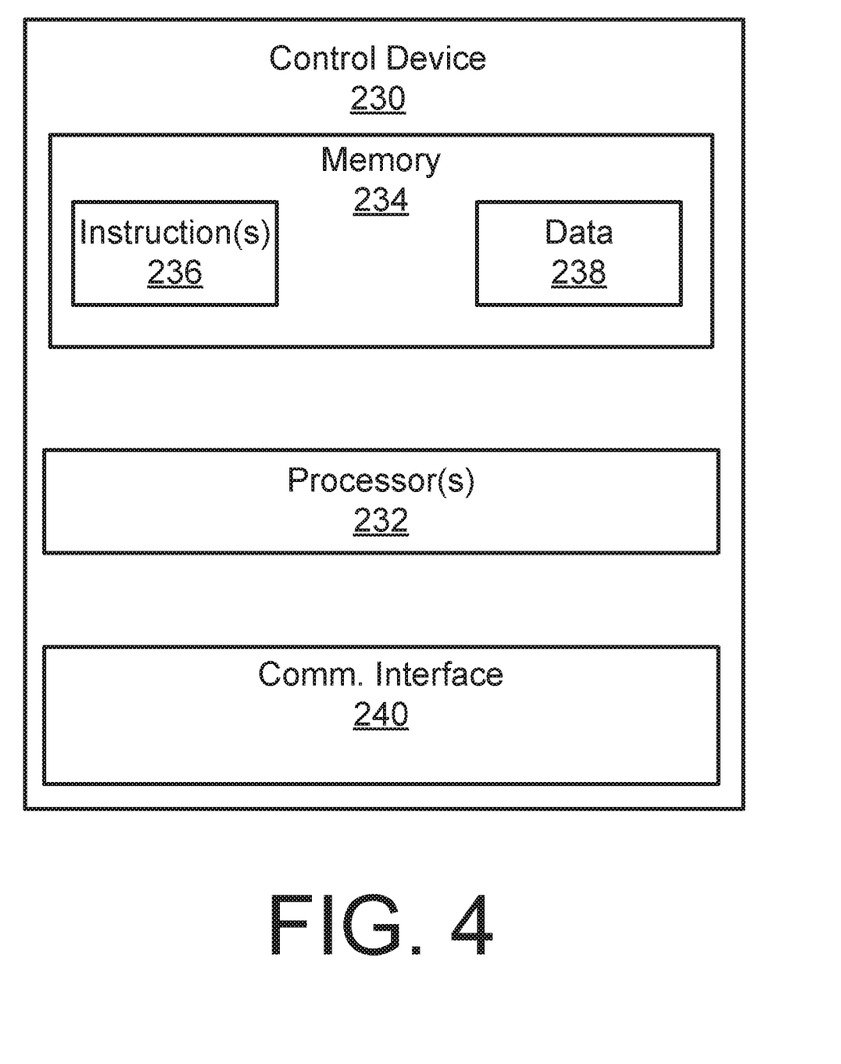
FIG. 4 provides a block diagram of an example control device according to example embodiments of the present disclosure.

As shown in FIGS. 3 and 4, the auxiliary load 210 can additionally or alternatively include one or more control device(s) 230. For instance, the control device(s) 230 can include at least one processor 232 and associated memory device 234 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Examples of the memory device 234 can include computer-readable media including, but not limited to, non-transitory computer-readable media, such as RAM, ROM, hard drives, flash drives, or other suitable memory devices.

The memory device 234 can store information accessible by the processor(s) 232, including computer-readable instructions 236 that can be executed by the processor(s) 232. The computer-readable instructions 236 can be any set of instructions that, when executed by the processor(s) 232, cause the processor(s) 232 to perform operations. The computer-readable instructions 236 can be software written in any suitable programming language or can be implemented in hardware. In some implementations, the computer-readable instructions 236 can be executed by the processor(s) 232 to perform operations, such as generating a control action associated with presenting an alarm or notification based on an environmental parameter associated with the room or space in which the lighting fixture 100 is located. For instance, the processor(s) 232 can generate a control action based on data received from the sensor(s) 220. The memory device 234 can further store data 238 that can be accessed by the control device(s) 230. In example embodiments, the data 238 can include data received from the sensor(s) 220.

Additionally or alternatively, as shown in FIG. 4, the control device(s) 230 can include a communication interface 240. In example embodiments, the communications interface 240 can include associated electronic circuitry that can be used to communicatively couple the control device(s) 230 with other devices, such as the sensor(s) 220. In some embodiments, the communication interface 240 can allow the control device(s) 230 to communicate directly with other devices. As will be discussed below, the communication interface 240 can provide for communication with other devices over a network 170 (FIG. 5).

Figure 5:
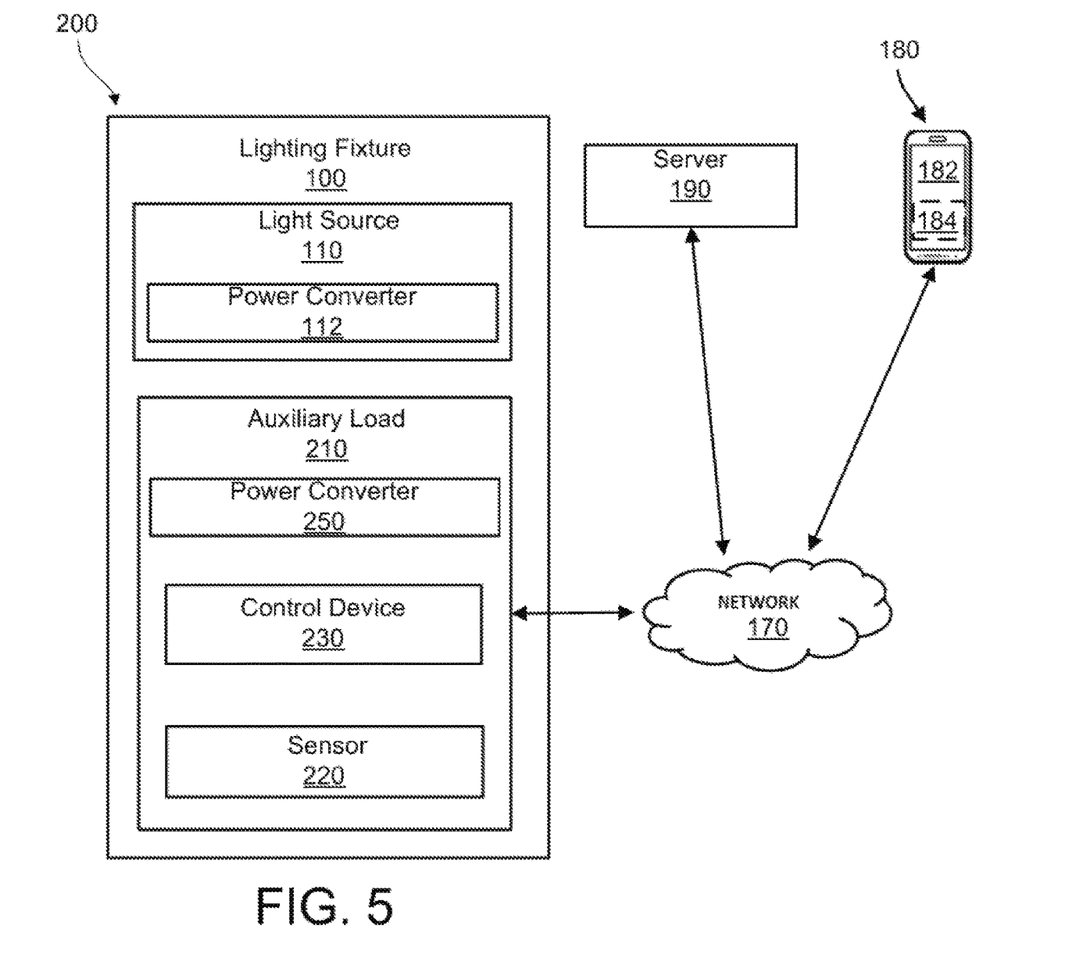
FIG. 5 provides a light system according to example embodiments of the present disclosure.

Referring to FIG. 5, the network 170 can be any suitable type of network. For instance, the network 170 can be a local area network (e.g., intranet), wide area network (e.g., internet), low power wireless network (e.g., Bluetooth Low Energy (BLE), Zigbee, etc.), or some combination thereof and can include any number of wired or wireless links. In general, communication over the network 170 can be implemented via any type of connection, using a wide variety of communication protocols, encodings or formats, and/or protection schemes.

Example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), etc. Other suitable wired and/or wireless communication technologies can be used without deviating from the scope of the present disclosure.

In some implementations, the control device(s) 230 can generate one or more control actions associated with controlling operation of the light source 110. For instance, the control action(s) can include activating (e.g., turn on) or deactivating (e.g., turn off) the light source 110. More specifically, the control device(s) 230 can command the light source 110 to flash (that is, activate and deactivate) at a predetermined frequency. In this way, the light source 110 can be used to indicate an environmental condition (e.g. fire) detected based, at least in part, on data from the sensor(s) 220.

In some implementations, the control device(s) 230 can communicate with a user device 180 over the network 170. The user device 180 can be any suitable type of device, such as, for example, a personal computing device (e.g., laptop or desktop), a mobile computing device (e.g., smartphone or tablet), a wearable computing device, an embedded computing device, a remote computing device, or any other suitable type of computing device. The user device 180 can include one or more computing device(s) 184 with the same or similar components as described above with regard to the control device(s) 230. For instance, the computing device 184 of the user device 180 can include one or more processors and one or more memory devices that store instructions that are executable by the processor to cause the user device 180 to perform operations, such as e.g., communicating one or more control signals over the network 170 to the control device(s) 230. In this way, a user can control operation of the light source 110 via the user device 180.

In some implementations, the control device(s) 230 can communicate data to the user device 180 via the communication interface 240. For instance, the control device(s) 230 can provide data captured by the sensor(s) 220 to the user device 180. The information can be displayed (e.g., via a display device) or otherwise presented (e.g., via audio speakers) to the user through a suitable interface 182. In this way, a user can observe data collected by the sensor(s) 220.

In some implementations, the control device(s) 230 can communicate a notification or alert indicative of a detected environmental condition (e.g., fire) to the user device 180 via the communication interface 240. For instance, the control device(s) 230 can communicate an electronic message (e.g., email, short message service (SMS) text message, etc.) indicating a detected environmental condition for the first space 130 (FIG. 1). In this way, a person using the user device 180, such as a homeowner, can be apprised of the detected environmental condition.

In some implementations, the lighting fixture 200 can include a power converter 240 configured to receive an input power from the power source 160 and convert the input power to an output power (DC power) suitable for powering the sensor(s) 220 and the control device(s) 230.

Figure 6:
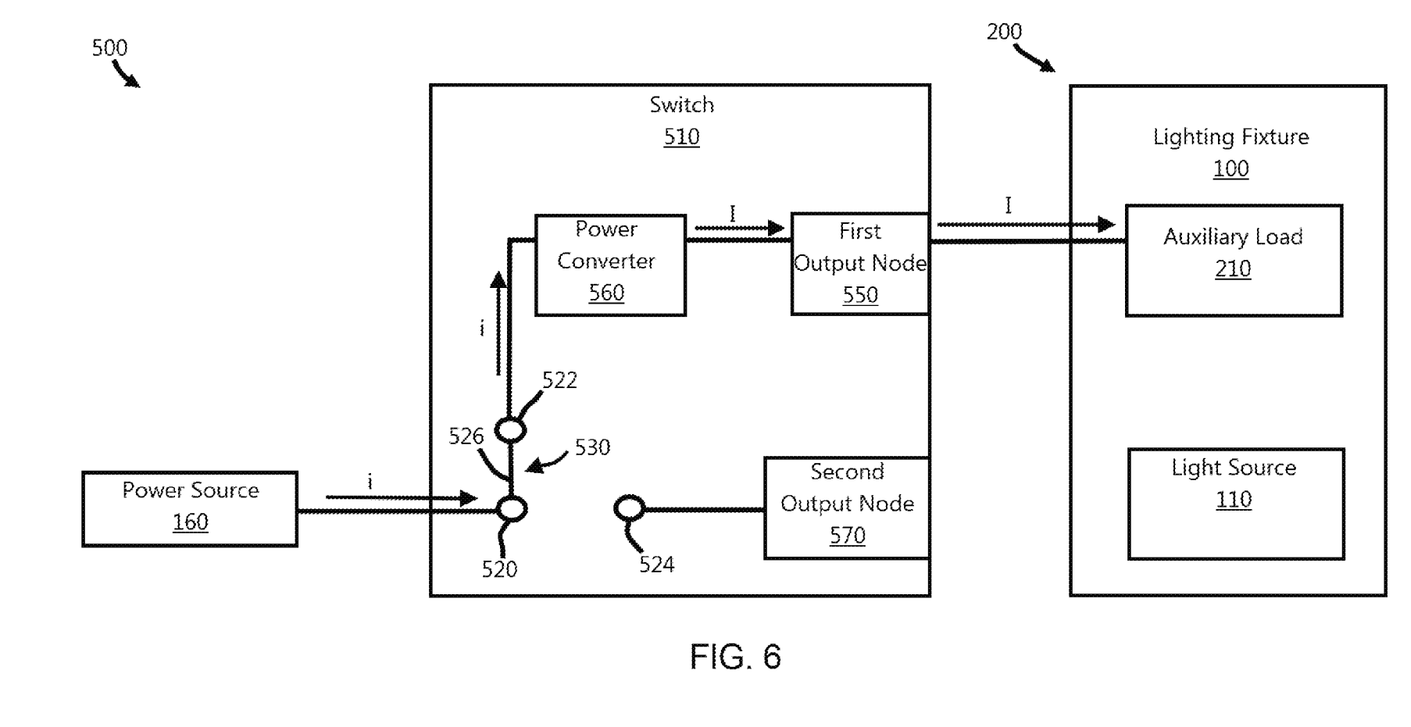
FIG. 6 provides a schematic of a system for controlling operation of a lighting system according to example embodiments of the present disclosure.
Figure 7:
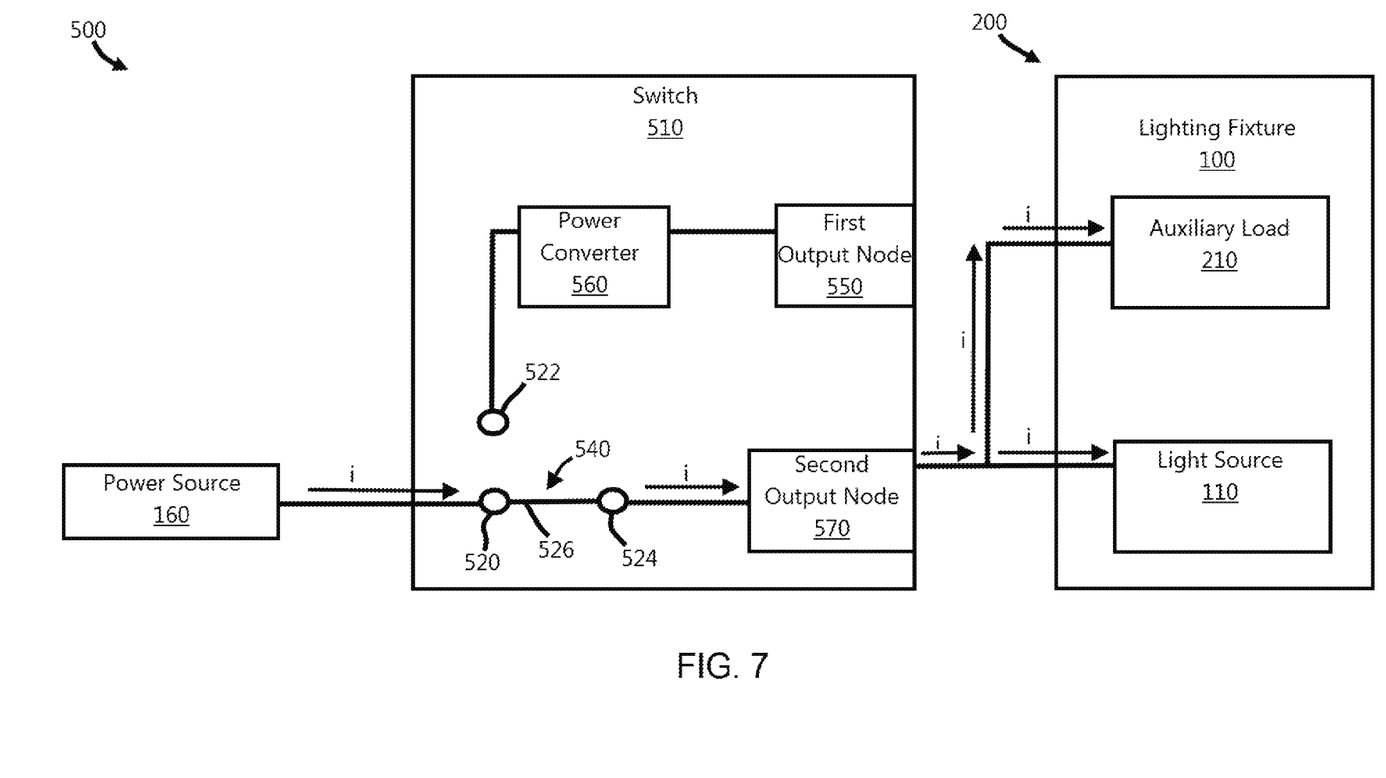
FIG. 7 provides another schematic of the system of FIG. 6 according to example embodiments of the present disclosure.

Referring now to FIGS. 6 and 7, a system 500 for controlling operation of the lighting system 200 is provided according to example embodiments of the present disclosure. As shown, the system 500 can include a switch 510. In some implementations, the switch 510 can include a first terminal 520, a second terminal 522, and a third terminal 524. The switch 510 can include a contactor 526 coupled to the first terminal 520 and movable between a first position 530 and a second position 540. When the contactor 526 is in the first position 530, the contactor 526 can couple the first terminal 520 to the second terminal 522. When the contactor 526 is in the second position 540, the contactor 526 can couple the first terminal 520 to the third terminal 524. As will be discussed below in more detail, the switch 510 can be coupled to the power source 160 and can be used to distribute electrical power to the lighting system 200. A user can manipulate the position of the contactor 526 by toggling the switch 510.

In some implementations, the first terminal 520 can receive electrical power from the power source 160, such as AC power. The AC power can be, for instance, 120V mains power or other suitable power. As mentioned above, the contactor 526 can be used to selectively couple the first terminal 520 to the second or third terminals 522, 524. More specifically, the second terminal 522 can receive the electrical power when the contactor 526 is in the first position 530. The third terminal 524 can receive the electrical power when the contactor 526 is in the second position 540.

As shown, the switch 510 can include a first output node 550 coupled to the second terminal 522. In this way, the switch 510 can output electrical power at the first output node 550 when the contactor 526 is in the first position 530. In some implementations, the switch 510 can include a power converter 560 coupled between the second terminal 522 and the first output node 550. The power converter 560 can be configured to convert alternating current power from the power source 160 to direct current power. The power converter 560 can include, for instance, a rectifier, one or more switching elements (e.g., transistors) and filters and/or other circuit components for converting AC power to DC power. As such, when the contactor 526 is in the first position 530, the switch 510 can output DC power at the first output node 550. In some implementations, the first output node 550 can be coupled to the auxiliary load 210 of the lighting system 200. In this way, the switch 510 can provide DC power to the auxiliary load 210 when the contactor 526 is in the first position 530.

Still referring to FIGS. 6 and 7, the switch 510 can include a second output node 570 coupled to the third terminal 524. In this way, the switch 510 can output electrical power at the second output node 570 when the contactor 526 is in the second position 540. More specifically, the switch 510 can output AC power at the second output node 570. In some implementations, the second output node 570 can be coupled to both the light source 110 of the lighting system 200 and the auxiliary load 210 of the lighting system 200. In this way, the switch 510 can provide AC power to both the light source 110 and the auxiliary load 210 when the contactor 526 is in the second position 540.

Figure 8:
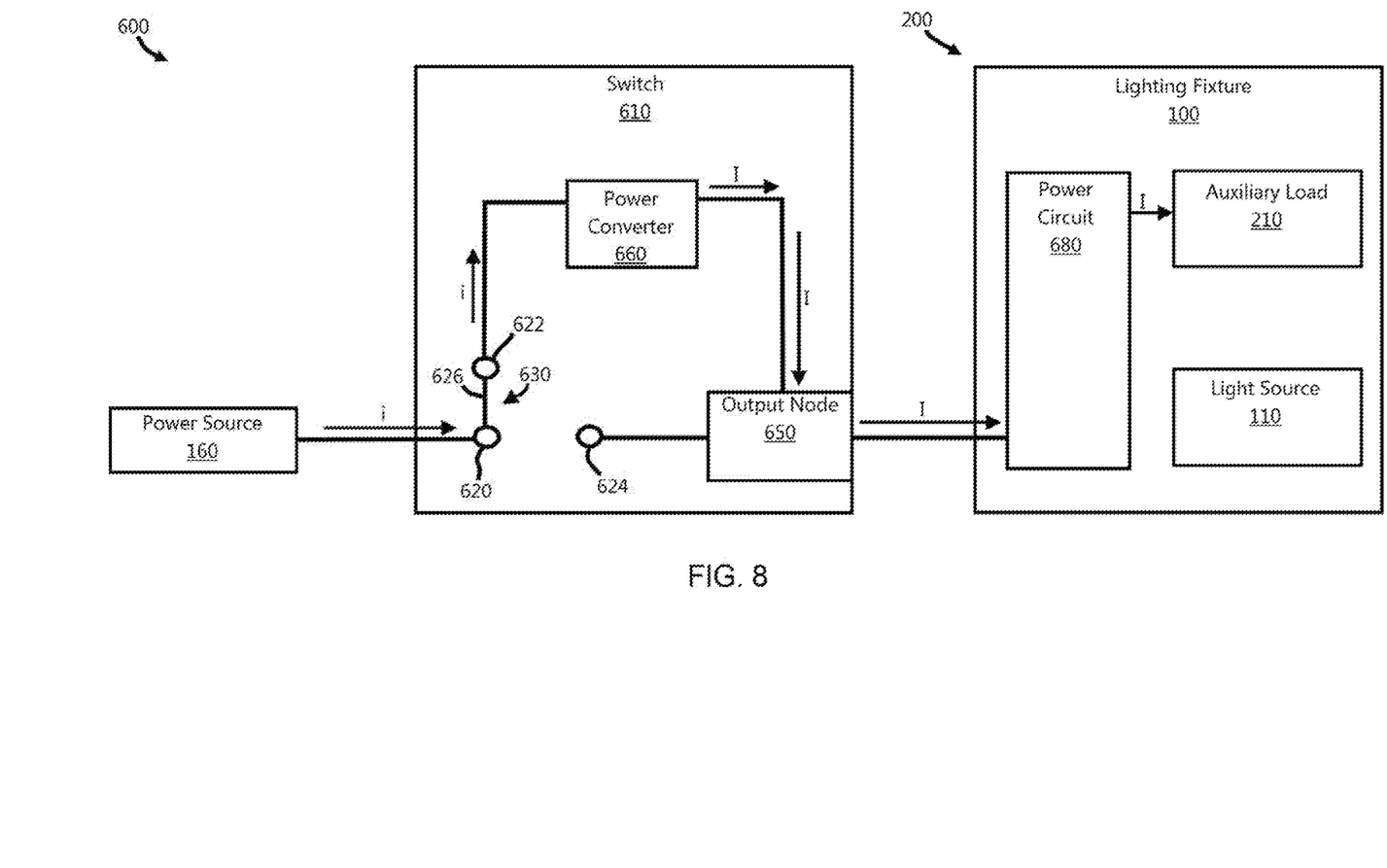
FIG. 8 provides a schematic of another system for controlling operation of a lighting system according to example embodiments of the present disclosure.
Figure 9:
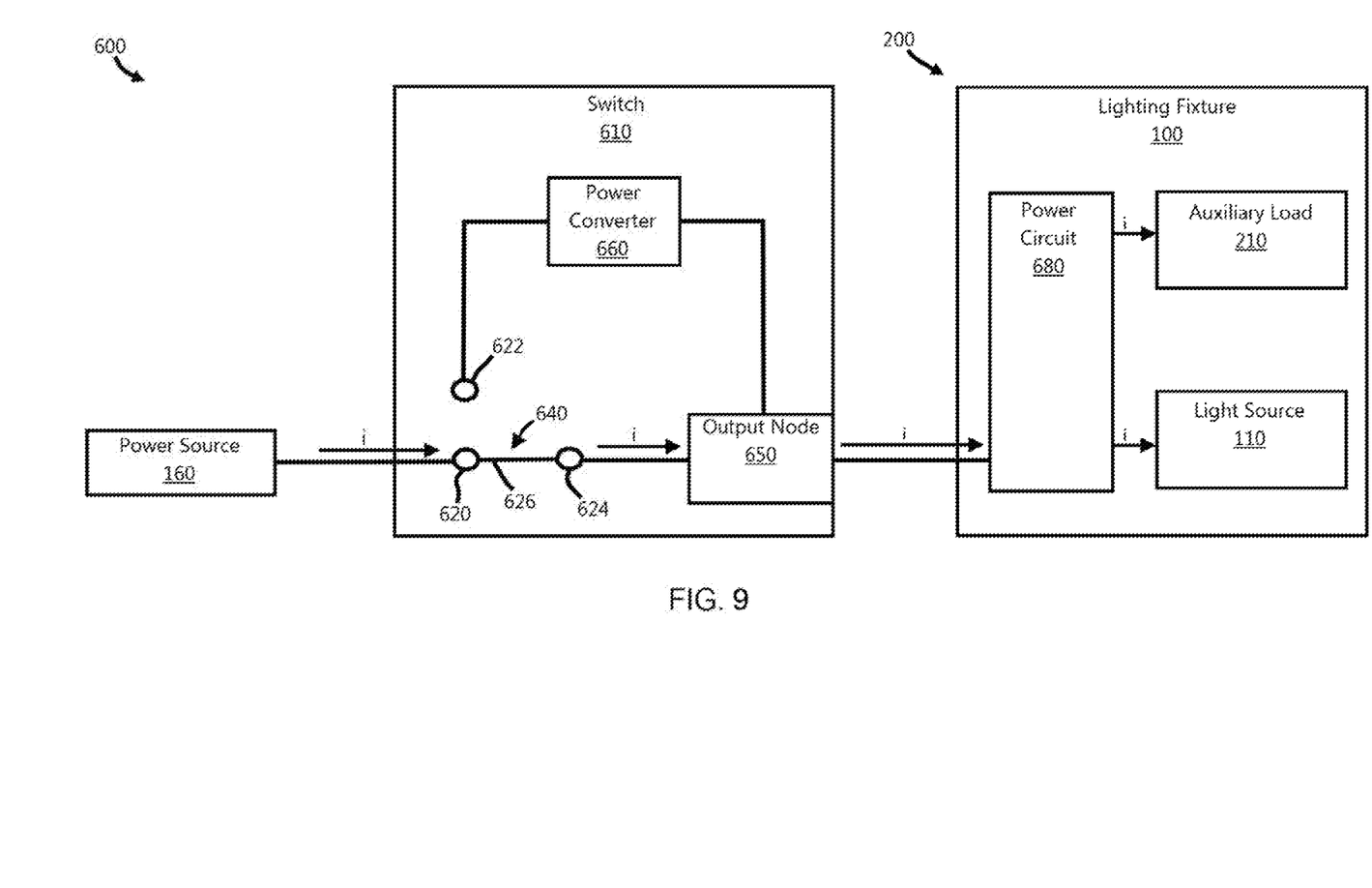
FIG. 9 provides another schematic of the system of FIG. 8 according to example embodiments of the present disclosure.

Referring now to FIGS. 8 and 9, another system 600 for controlling operation of the lighting system 200 is provided according to example embodiments of the present disclosure. As shown, the system 600 can include a switch 610. In some implementations, the switch 610 can include a first terminal 620, a second terminal 622, and a third terminal 624. The switch 610 can include a contactor 626 coupled to the first terminal 620 and movable between a first position 630 and a second position 640. When the contactor 626 is in the first position 630, the contactor 626 can couple the first terminal 620 to the second terminal 622. When the contactor 626 is in the second position 640, the contactor 626 can couple the first terminal 620 to the third terminal 624. As will be discussed below in more detail, the switch 610 can be coupled to the power source 160 and can be used to distribute electrical power to the lighting system 200. A user can manipulate the position of the contactor 626 by toggling the switch 610.

In some implementations, the first terminal 620 can receive electrical power from the power source 160, such as AC power. The AC power can be, for instance, 120V mains power or other suitable power. As mentioned above, the contactor 626 can be used to selectively couple the first terminal 620 to the second terminal 622 or the third terminal 624. More specifically, the second terminal 622 can receive the electrical power when the contactor 626 is in the first position 630. The third terminal 624 can receive the electrical power when the contactor 626 is in the second position 640.

As shown, the switch 610 can include an output node 650 coupled to the second terminal 622 and the third terminal 624. In some implementations, the switch 610 can include a power converter 660 coupled between the second terminal 622 and the output node 650. The power converter 660 can be configured to convert alternating current power from the power source 160 to direct current power. The power converter 660 can include, for instance, a rectifier, one or more switching elements (e.g., transistors) and filters and/or other circuit components for converting AC power to DC power. As such, when the contactor 626 is in the first position 630, the switch 610 can output DC power at the output node 650. When the contactor 626 is in the second position 640, the switch 610 can output AC power at the output node 650.

The system 600 can include a power circuit 680 in electrical communication with the switch 610 and both the light source 110 and the auxiliary load 210. In some implementations, the power circuit 680 can be onboard the lighting fixture 100. In alternative implementations, the power circuit 680 can be external to the lighting fixture 100. The power circuit 680 can include, for instance, one or more switching elements (e.g., transistor) and/or other circuit components for routing DC power to the auxiliary load 210 or AC power to both the light source 110 and the auxiliary load 210. As will be discussed below in more detail, the power circuit 680 can be configured to route DC power or AC power based on a position of the contactor 626.

When the contactor 626 is in the first position 630, the power circuit 680 receives the DC power from the switch 610 and routes the DC power to the auxiliary load 210. When the contactor 626 is in the second position 640, the power circuit 680 receives the AC power from the power source 160 via the switch 610 and routes the AC power to both the light source 110 and the auxiliary load 210. In this way, the auxiliary load 210 can receive DC power when the contactor 626 has been moved to the first position 630 to deactivate (e.g., power off) the light source 110.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:
1. A switch, comprising:
a first terminal;
a second terminal;
a third terminal;
a single output node coupled to the second terminal and the third terminal; and
a contactor coupled to the first terminal and movable between a first position and a second position, the first terminal coupled to the second terminal when the contactor is in the first position, the first terminal coupled to the third terminal when the contactor is in the second position;
wherein when the contactor is in the first position, the switch is configured to provide direct current power at the single output node, and wherein when the contactor is in the second position, the switch is configured to provide alternating current power at the single output node.

2. The switch of claim 1, wherein the switch comprises a power converter coupled between the second terminal and the single output node.

3. The switch of claim 2, wherein when the contactor is in the first position, the power converter is configured to convert alternating current power to direct current power and provide the direct current power to the single output node.

4. A system for controlling operation of a lighting fixture comprising a light source and an auxiliary load, the system comprising:
 a single switch couplable to a power source for the lighting system, the single switch movable between at least a first position and a second position,
 wherein when the single switch is in the first position, the single switch is configured to provide direct current power to the auxiliary load, and
 wherein when the single switch is in the second position, the single switch is configured to provide alternating current power to both the auxiliary load and the light source.

5. The system of claim 4, wherein the single switch comprises:
 a first terminal;
 a second terminal;
 a third terminal;
 an output node coupled to the second terminal and the third terminal; and
 a contactor coupled to the first terminal and movable between the first position and the second position, the first terminal coupled to the second terminal when the contactor is in the first position, the first terminal coupled to the third terminal when the contactor is in the second position,
 wherein when the contactor is in the first position, the single switch is configured to provide direct current power at the output node, and
 wherein when the contactor is in the second position, the single switch is configured to provide alternating current power at the output node.

6. The system of claim 5, wherein the single switch comprises a power converter coupled between the second terminal and the output node.

7. The system of claim 6, wherein when the contactor is in the first position, the power converter is configured to convert the alternating current power to the direct current power and provide the direct current power to the output node.

8. The system of claim 4, wherein the auxiliary load comprises a camera disposed within a lighting fixture of the lighting system.

9. The system of claim 4, wherein the auxiliary load comprises one or more sensors operable to sense one or more environmental parameters associated with a space in which the one or more sensors are located.

10. The system of claim 9, wherein the one or more environmental parameters comprise an amount of carbon monoxide within the space.

11. The system of claim 9, wherein the auxiliary load further comprises one or more control devices configured to control operation of the light source based, at least in part, on the one or more environmental parameters detected by the one or more sensors.

12. The system of claim 11, wherein the one or more control devices are configured to flash the light source at a predetermined frequency to indicate occurrence of an environmental condition within the space.

13. The system of claim 12, wherein the environmental condition includes at least one of a fire and a carbon monoxide leak.

14. The system of claim 5, further comprising a power circuit coupled between the first output node and the auxiliary load.

15. The system of claim 14, wherein the power circuit is coupled between the output node and the light source.

16. The system of claim 15, wherein the power circuit is external to a lighting fixture configured to accommodate the light source and the auxiliary load.

17. The light system of claim 15, wherein the power circuit is disposed within a lighting fixture configured to accommodate the light source and the auxiliary load.

18. A switch, comprising:
 a first terminal;
 a second terminal;
 a third terminal;
 a first output node coupled to the second terminal and configured to be further coupled to a light fixture;
 a second output node coupled to the third terminal and configured to be further coupled to the light fixture; and
 a contactor coupled to the first terminal and movable between a first position and a second position, the first terminal coupled to the second terminal when the contactor is in the first position, the first terminal coupled to the third terminal when the contactor is in the second position;
 a power converter coupled between the second terminal and the first output node;
 wherein when the contactor is in the first position, the switch is configured to provide direct current power at the first output node,
 wherein when the contactor is in the second position, the switch is configured to provide alternating current power at the second output node, and
 wherein when the contactor is in the first position, the power converter is configured to convert the alternating current power to the direct current power and provide the direct current power to the first output node.

19. The switch as recited in claim 18, wherein said first output node is configured to provide power to an auxiliary load of said light fixture.

20. The switch as recited in claim 18, wherein said second output node is configured to provide power to an auxiliary load of said light fixture and a light source of said light fixture.

* * * * *